April 5, 1966     A. A. KAEHLER     3,244,538
METHOD OF REDUCING THE FAT CONTENT OF FRIED FOODS
Filed July 13, 1962
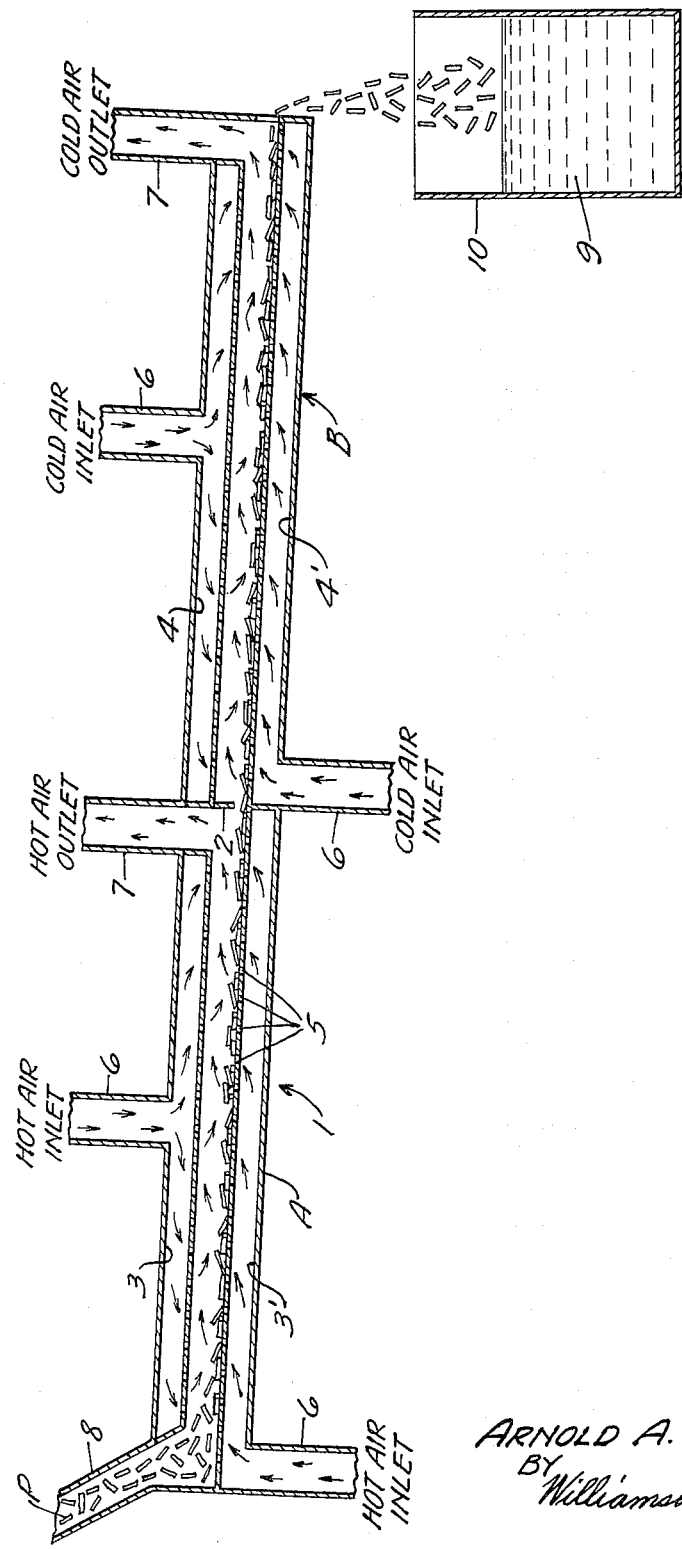
INVENTOR
ARNOLD A. KAEHLER
BY
Williamson & Palmatier
ATTORNEYS United States Patent Office 3,244,538
Patented Apr. 5, 1966

3,244,538
METHOD OF REDUCING THE FAT CONTENT
OF FRIED FOODS
Arnold A. Kaehler, 905 W. 3rd, Red Wing, Minn.
Filed July 13, 1962, Ser. No. 209,555
10 Claims. (Cl. 99—199)

This invention is directed to a novel method of preparing food products for frying in a medium such as hot oil or fat, particularly french style frying, which produces a lower fat content in the fried product and has other advantages set forth hereinafter.

Although this invention is applicable to the preparation of food for all types of frying, it is particultrly effective in preparing foods for french frying wherein the product is immersed in hot oil for heating or baking thereof, although it is understood that the invention is not necessarily limited to french frying per se.

French fried foods such as doughnuts, french fried potatoes, potato chips, etc., are known to have a relatively high fat content and therefore are usually considered as foods to be avoided by many people. In recent years the public has become more diet and figure conscious than ever before and as a result fried foods have become progressively less popular.

Therefore, a primary object of this invention is to provide a method of processing fried foods which produces a fried product having a substantially lower fat content than corresponding fried products presently available.

Still another object is to provide a method of processing fried foods which results in a fried product having less fat, higher moisture content (where desirable), improved flavor, eating quality, appearance and longer shelf life as compared with corresponding products processed by conventional methods.

A still further object is a novel method of processing fried foods which requires a shorter frying or cooking time, effects a considerable saving in the amount of shortening or oil used and decreases the rate of deterioration of the frying medium.

Still another object is to provide a novel method of processing fried foods whereby surface cracking, blistering, and pocking or cratering is reduced or minimized, and improves the ability of the processor to control the color of the fried product.

These and other objects and advantages of my invention will more fully appear from the following description made in connection with the accompanying drawing which is a somewhat diagrammatic example of apparatus which can be employed in carrying out the method of this invention.

The method of this invention broadly comprises conditioning the surface of products to be heated or fried in hot cooking oil and thereby effecting a change in said surface whereby a protective barrier which may also be termed a crust, skin or film is formed which resists absorption and permeation by said oil. I have found that this oil resisting capacity can best be accomplished and the protective barrier formed by tempering the surface by drying alone or drying and cooking only the surface of the product followed by cooling of the dried or dried and cooked surface. The surface of the product when conditioned in this manner is sufficiently elastic to permit expansion of the product during subsequent frying in the hot oil with greatly reduced cracking or breaking of said surface.

In addition, the conditioned surface not only resists the absorption and penetration of the oil into the product, but also serves to hold moisture in and prevent the escape of moisture and other gases during frying. Thus, during frying, the conditioned surface or skin resists absorption and penetration of the oil and also resists escape of moisture and other gases while allowing the heat from the hot oil to complete the cooking or baking, thereby producing a fried product having a substantially lower fat content and substantially higher moisture content than presently available fried products made by conventional and presently known methods. Because of the retention of moisture and other gases during frying and the lower fat content, the resultant fried product has improved flavor and eating qualities compared to conventionally processed foods. Because less oil is absorbed by the products, there is a considerable saving in the amount of cooking oil or fat required. Because the surface of the products have had a substantial portion of the surface moisture removed therefrom prior to frying, and because the elastic conditioned surface or skin inhibits the escape of moisture from the interior of the product during frying, there is substantially less moisture which escapes to and mixes with the hot oil or fat and thereby decreases the rate of deterioration of the frying oil or fat and increases the effective life and quality thereof. When it is necessary to drive out all possible moisture as with potato chips, improved flavor and keeping quality together with lower fat content results.

The preliminary drying of the surface of the product also has the advantage that it reduces blistering or bubbling on the surface of the fried product which so often occurs in conventional frying methods due to the entrapment or moisture near the surface and subsequent expansion thereof during frying.

The initial treatment step in the method of this invention comprises drying of the surface of the product with or without accompanying baking or cooking thereof, although improved results are usually obtained by both drying and cooking. However, an improved fried product will be attained by a process which includes preliminarly drying without cooking. The drying should effect a substantial reduction in the moisture content on and just under the surface. The drying may be accomplished by any suitable method. One preferred method is to "flash heat" the product by subjecting is to a hot blast of air for a very short period of time. Still another method is to oven dry, which however, requires a longer treatment time. Dry heat or superheated steam may be employed. If the drying is to be accomplished without cooking, the moisture removal can also be accomplished by any suitable method such as by a blast of low temperature air or by vacuum drying. The temperatures and treatment times can be varied considerably depending upon the product being treated and the personal preferences of the particular processor. However, typical treatment times and temperatures are set forth hereinafter in the more detailed discussions of certain specific products successfully treated by this method.

The removal of moisture from the surface should be substantial but preferably not complete so that some residual surface moisture remains when the subsequent cooling is initiated. However, sufficient surface moisture should be removed to prevent subsequent blistering and cratering. To provide a product having a high moisture content, the preliminary drying step with or without the use of heat to accomplish cooking or baking of the surface is preferably performed under such conditions as to leave the moisture content of the interior substantially unchanged, and leave the interior in a substantially uncooked or raw state. The interior referred to herein is that portion of the product beneath and with the protective outer surface or skin. The fastest and most satisfactory method of achieving this is to treat the surface with a blast of air to effect very rapid or flash evaporation of moisture therefrom. If hot air is employed, the temperature thereof is preferably as high as possible consistent with avoiding burning or undesirable discoloration of the surface. Exposure time and rate of drying should also be controlled to avoid discoloration due to oxidation, which may occur if the drying is unduly slow. This flash drying and cooking enables the surface to be conditioned to the extent desired without effecting any significant change in the interior. Since the rate of evaporation and amount of moisture removed varies with and is dependent upon the particular drying method employed and the factors involved, such as temperature, degree of air movement, and treatment time, these factors can be varied as desired to accomplish the desired surface conditioning hereinbefore described.

When the aforedescribed surface drying operation, with or without cooking, has been accomplished, the product is subjected to the second or cooling step of this invention. The cooling conditions the surface, strengthens it and makes it elastic so that it can expand with less cracking. The cooling preferably takes place almost immediately after the drying operation and is preferably a rapid cooling process in which the partially dried and partially cooked product is treated in a cooling medium preferably at subfreezing (below 32° F.) temperatures, and more preferably at sub-zero temperatures to complete the formation of the desired elastic skin or crust which resists the absorption of the oil and the escape of interior moisture and gases. This cooling operation may also be accomplished in any suitable fashion, one preferred method being to subject the product to a blast of freezing air for a short period of time to achieve flash cooling or freezing of the surface. However, other refrigeration methods can be employed if desired. To attain the elastic protective skin desired, the surface is preferably cooled to or below freezing temperature, but the desired elasticity and protective capacity of the surface will be attained if surface freezing is not accomplished. If the product is to be fried immediately after cooling, the interior should be maintained in an unfrozen state, and preferably as warm as possible, in order to achieve maximum temperature differential between the surface and the interior. This is most satisfactorily accomplished by the aforementioned flash cooling or freezing procedure with a blast of cold air, which also effects some additional drying of the surface, and which effects more rapid moisture evaporation and removal than still air. This expedites the subsequent frying operation by shortening the frying time required to complete the cooking of the product, and aids in producing the lower fat, higher moisture product desired. If the treated product is not to be fried immediately after tempering of the surface, the product may be quickly frozen all the way through for frozen storage and shipment thereof with the frying to be accomplished at some future time.

The cooling conditions employed are dependent in part upon the prior drying and cooking operation and the conditions of the product when submitted to the cooling operation and can be adjusted accordingly to attain the surface conditioning desired.

Again, as in the drying operation, the treatment times and temperatures employed may vary considerably according to the nature of the product and the particular desires of the individual processor. However, on a commercial scale, it is desirable to accomplish both the drying and the cooling as quickly as possible consistent with the economics of the situation. Thus, the hotter the drying temperature and the colder the cooling temperature, the shorter teh period of treatment time required. However, extreme temperatures, both hot and cold, present certain problems such as requiring special expensive equipment, and in some instances the processor might find it more desirable economically to use less extreme temperatures and slightly longer treatment time to accomplish the drying and/or cooling with less expensive and more conventional equipment available to him.

The surface of the treated, unfried products is dry in appearance and is white or lighter in color than the interior when viewed in cross-section. This surface color can then be varied and changed to the color desired in the fried product by controlling the frying conditions.

Fried products pretreated according to this invention have a much smoother surface than corresponding conventional untreated products. Their surfaces are less cracked and broken, and have fewer blisters and craters or pocks normally present on conventional fried products due to the presence of surface moisture on and under the surface and the expansion and evaporation thereof during frying. It will also be appreciated that the freedom from cracks and breaks provides a continuous protective surface skin having fewer openings therein through which oil can penetrate to the interior and through which interior moisture can escape.

Products pretreated according to this invention require a shorter-frying time than corresponding untreated products. This is attributable primarily to the previous elimination of surface moisture. Surface moisture retards heat penetration and must be removed before the heat of the frying process will take effect and in untreated products delays the cooking of the interior until removed by the hot frying medium. Other contributing factors are the partial preliminary cooking effected during the preliminary drying, and the retention of moisture in the interior by the protective skin. The latter is not of material significance in very thin products such as potato chips, but is in bulkier products such as french fried potatoes and doughnuts.

It is understood that the method of this invention may be used in combination with other presently known pretreatment methods, such as blanching or treatment with various chemicals dissolved in water.

The fried products of this invention have longer shelf or storage life than corresponding conventional products which have not been pretreated according to this invention. The protective skin contributes materially to this longer shelf life due to its ability to resist penetration thereof by moisture. This skin holds in the moisture present in the fried product and resists escape thereof during storage and resultant drying out and resists absorption of additional moisture during storage thereby maintaining the desired moisture content for a longer period of time. Another contributing factor is the reduced exposed surface area resulting from the smoother surface. Because of this there is less fat exposed to the air, and therefore less oxidation and resultant rancidity therefrom. Another factor is that there is less free unattached fat, the remaining fat being more integrally united with the product. Still another contributing factor, particularly in potato products, is the conversion by the preliminary heating of some of the natural potato starches to a sugar in such a way that the combination with fat is reduced. The pretreatment of this invention and the resultant reduced surface moisture makes possible better control over the color of the fried product, and provides a bigger range of temperature and time ratios in the frying operation to achieve the particular color desired.

The accompanying drawings illustrates one means of carrying out one embodiment of the method of this invention. A downwardly inclined elongate duct or conveyor 1 is provided which is divided by a baffle or partition 2 into two parts A and B respectively, part A constituting the drying section and B representing the cooling section. Each of the compartments are provided with upper and lower air intake chambers or manifolds, those in compartment A being identified by 3 and 3' respectively, those in compartment B by 4 and 4' respectively. The manifolds each have a multiplicity of openings 5 therein communicating with the duct interior for admitting jets of air into the interior of the conveyor to treat and temper the product passing therethrough. Each of the manifolds is also provided with suitable air intake ducts 6 for receiving air under pressure from a source not shown. Each of the compartments is provided with an air exhaust duct 7 for removing the air therefrom after treatment of the product. The manifolds of compartment A are supplied with hot air for initially drying and partially cooking the product surface and the manifolds of compartment B are supplied with cold air to achieve cooling of the product surface. The openings 5 in the lower manifolds 3' and 4' are so designed and arranged and the air pressure is such as to proferably provide an air cushion or slide for the articles passing through the conveyor in order that the jets of air may either constitute the sole means of moving the articles through the conveyor or so that they may at least assist in such movement, as in the form shown employing an inclined conveyor. Thus, in operation, the shaped or formed raw product such as the french fries P is admitted to compartment A through a feed duct 8 and quickly passed therethrough and in its passage therethrough the surface of the individual pieces are quickly dried and cooked to the extent desired by the jets of hot air from the openings 5 in the upper and lower manifolds 3 and 3'. The pieces then pass immediately under the partition 2 to the cooling chamber B and quickly passed therethrough where the jets of cold air from the openings 5 in the upper and lower manifolds 4 and 4' cool the surface of the pieces to the desired degree to form the elastic film desired to resist permeation by the fat. Upon reaching the lower end of compartment B, the pretreated pieces are discharged therefrom and immediately subjected to a deep frying or french frying operation by dropping them directly into a bath of hot oil 9 held in a suitable container 10 for the time necessary to fry them and complete the baking or cooking thereof.

To better illustration and aid in the understanding of this invention, the invention is discussed in more detail hereinafter as specifically applied to french fried potatoes, potato chips and doughnuts, all of which have been successfully pretreated in the manner hereinbefore described and had the characteristic desirable features of products of this invention.

*French fried potatoes*

According to the United States Department of Agriculture, Home and Garden Bulletin No. 72 (September 1960), the average moisture content of french fried potatoes is 45.8% and the average fat content thereof 12.1%.

French fries from different sources were purchased on the open market and analyzed as follows:

|  | Moisture | Fat |
| --- | --- | --- |
| Restaurant A: |  |  |
| As-is moisture | 41.9 | 14.6 |
| 50% moisture basis | 50.0 | 12.6 |
| Restaurant A: |  |  |
| As-is moisture | 42.0 | 17.1 |
| 50% moisture basis | 50.0 | 14.6 |
| Restaurant B: |  |  |
| As-is moisture | 50.8 | 10.7 |
| 50% moisture basis | 50.0 | 10.8 |
| Company A Frozen French Fries: |  |  |
| As-is moisture | 53.9 | 8.1 |
| 50% moisture basis | 50.0 | 8.8 |
| Company B Frozen French Fries: |  |  |
| As-is moisture | 47.3 | 9.0 |
| 50% moisture basis | 50.0 | 8.5 |

However, with french fries treated according to the method of this invention involving preliminary drying, cooking and cooling, the resulting french fries were found to have more than 10% more moisture and from less than ½ to ⅔ the fat content of the average moisture and fat contents of conventional french fries as listed above. The interior of the french fries of this invention also have eating quality more like tht of a baked potato.

If french fries are to be flash dried and cooled, they can be successfully treated by subjecting the french fries to a blast of 600° F. air for about five seconds followed by treatment with a blast of —30° F. air for another five seconds. If the french fries are to be dried and cooled under still air conditions such as by drying in an oven and cooling in a refrigerated chamber, such can be successfully carried out by cooking the french fries for three minutes in a 400–450° F. oven followed by cooling of the french fries at —30° F. for about two minutes.

The following table illustrates the results of a series of tests on french fries as well as a control sample. The samples (except the control sample) were pre-dried at approximately 450° F. in a still air oven, and were pre-cooled in a still air refrigerated chamber at 20–32° F.

| Test No. | Time Heated (min.) | Time Cooled (min.) | Frying Time (min.) | Percent Fat | Percent Water | Percent Fat Equalized at 50% Water |
| --- | --- | --- | --- | --- | --- | --- |
| A | 6½ | 5 | 2½ | 4.7 | 53.7 | 5.05 |
| Control |  |  | 4½ | 6.85 | 49.4 | 6.75 |
| B | 4 | 5 | 2½ | 3.10 | 55.6 | 3.5 |
| C | 6 | 5 | 5 | 4.4 | 54.2 | 4.85 |
| D | 8 | 5 | 5 | 4.45 | 49.9 | 4.45 |
| E | 10 | 5 | 5 | 4.75 | 55.6 | 5.35 |

From the foregoing table, it can be seen that the fat content of the french fries treated according to this invention is on the order of 3.1% to 4.75%, which percentage is far below the 12% fat content indicated by the Department of Agriculture as being the average fat content for french fries, and far below the 8–17% range of fat content of french fries purchased on the open market as set forth hereinbefore. It will also be noted that the fat content of the treated samples was substantially lower than that of the untreated control sample (which had been carefully processed to minimize fat permeation) and the moisture content of the treated samples was higher in each instance than that of the control sample, and that the moisture content of the treated samples was more than that of the aforementioned normal average.

It is further interesting to note that some of the samples such as C, D and E were fried longer than the control sample whereas samples A and B were fried for a shorter period of time than the control sample and yet, in each instance, the fat content of the fried product was less than that of the control sample thereby attesting to the ability of the treated products to resist the absorption and penetration of fat.

*Potato chips*

To flash heat and cool potato chips, it is recommended that the potato chips be treated initially with a blast of hot air at about 800° F. for about five seconds, followed immediately by treatment with a blast of cold air at —30° F. for another five seconds. If the chips are to be heated and chilled in still air, the same suggested operational temperatures and times apply as were suggested for the french fries, namely 400–450° F. for three minutes followed by cooling at —30° F. for two minutes.

*Doughnuts*

Cake type doughnuts can be treated the same as french fries for both blast and still air type heating and cooling. In the case of yeast raised doughnuts, it is recommended that for flash heating and cooling, that the doughnuts be subjected to a blast of hot air at about 600° F. for about two seconds followed by treatment with a blast of cold air at 30° below zero for about five seconds. If this type of doughnuts is to be heated and cooled in still air, then the same conditions apply as for french fries and potato chips. In the treatment of doughnuts, the preliminary heating of the doughnut causes some preliminary expansion of the doughnut batter. However, the crust or skin which is formed by the preliminary drying and cooling is sufficiently elastic to permit further expansion of the doughnut without breaking of said skin when it is immersed in the hot oil. This skin inhibits the escape of moisture and gases from the inside of the doughnut during frying thereof and also resists permeation of the oil into the interior of the doughnut. The preliminary drying of the doughnuts prior to frying eliminates sufficient moisture from the surface thereof so as to avoid the formation of blisters of gas pockets in the surface of the doughnut during frying.

The term "surface" as used herein includes not only the outer periphery of the product, but also the portion or layer immediately underlying and adjacent to said periphery, the conditioned protective surface portion extending a shot distance beneath said periphery.

From the foregoing, it is apparent that I have developed a novel method of forming on products to be fried a protective outer surface or skin which resists permeation and penetration by a fluid medium, thereby inhibiting permeation by the frying fat and escape of moisture from the interior during frying, and inhibiting the absorption of atmospheric moisture after frying.

Although this disclosure has placed particular emphasis on the applicability of this invention to french fried potatoes, potato chips and doughnuts, it is to be understood that the invention is not limited to these particular products, and is applicable to all types of fried products, including American fried sliced potatoes, hash browned potatoes, seafood such as shrimp, fish, meat, etc.

It will, of course, be understood that various changes may be made in the form, details, arrangement and proportions of the various parts without departing from the scope of my invention.

What I claim is:

1. A method of preparing an edible fried product comprising treating the substantially raw product with a drying medium at a temperature not lower than the cooking temperature of said product and thereby removing a substantial portion, but not all of the moisture from the subsurface immediately adjacent the exterior surface while maintaining the moisture content of the interior substantially unchanged and simultaneously effecting at least partial cooking of said subsurface while maintaining the interior in said substantially raw condition, substantially immediately thereafter treating said product with a cooling medium and thereby cooling said subsurface to a temperature not substantially higher than the freezing temperature of said product while maintaining the temperature of the interior substantially unchanged, and substantially immediately thereafter frying the product while in substantially the dried, partially cooked and cooled condition effected by the aforementioned steps.

2. The method of claim 1, wherein said drying medium is a blast of rapidly moving hot air having a temperature not lower than the cooking temperature of the product and the cooling medium is a blast of rapidly moving cold air having a temperature not higher than the freezing temperature of the product.

3. A method comprising treating a substantially raw edible product so as to simultaneously dry and cook the subsurface immediately adjacent the exterior surface while maintaining the interior in said substantially raw condition and while maintaining the moisture content of the interior substantially unchanged, substantially immediately thereafter freezing said subsurface while leaving the temperature of the interior substantially unchanged, and substantially immediately thereafter frying said product while the subsurface is substantially in the dried, cooked and frozen condition effected by the aforementioned steps.

4. A method comprising treating a substantially raw edible product with a blast of hot drying air having a temperature not lower than the cooking temperature of the product and thereby quickly removing a substantial portion of the moisture from the subsurface immediately adjacent the exterior surface of the product, immediately thereafter treating said product with a blast of cold air having a temperature not higher than the freezing temperature of the product and thereby quickly materially reducing the temperature of said subsurface while the moisture content of said subsurface is at the reduced level effected by the aforementioned drying step, and immediately thereafter frying said product while said subsurface is substantially in the dried cooled condition effected by the aforementioned steps.

5. A method comprising treating a substantially raw edible product with a blast of rapidly moving hot drying air having a temperature not lower than the cooking temperature of the product for about 2 to 5 seconds, immediately thereafter treating said product with a blast of rapidly moving cold air having a temperature not higher than the freezing temperature of the product for about 5 seconds, and immediately thereafter frying said product while it is in the condition effected by the aforementioned steps.

6. A method of preparing an edible fried product comprising drying the substantially raw product thereby reducing the moisture content of the subsurface immediately adjacent the exterior surface thereof to a level substantially below the moisture level of the interior, cooking said subsurface while leaving the interior in substantially raw condition, cooling the dried cooked subsurface and thereby materially reducing the temperature thereof without materially reducing the temperature of the interior while said subsurface is in substantially the dried condition effected by the aforementioned drying step, and frying said product while said subsurface is in substantially the dried, cooked, cooled condition effected by the aforementioned steps.

7. The method of claim 6, wherein the drying and cooking of said subsurface are accomplished simultaneously by treating the raw product with a blast of hot air having a temperature not lower than the cooking temperature of the product for a period of time sufficient to remove a substantial portion of the moisture from said subsurface while leaving the moisture content of the interior substantially unchanged and whereby the subsurface is cooked while leaving the interior in substantially raw, uncooked condition, and wherein the cooling of said subsurface is accomplished by subjecting the product to a blast of cold air having a temperature not higher than the freezing temperature of the product.

8. A method of preparing an edible fried product comprising continuously conveying the substantially raw product along a predetermined path of travel to a frying apparatus, subjecting the raw product as it moves along said path of travel to a blast of hot air having a temperature not lower than the cooking temperature of the product thereby removing a substantial portion but not all of the moisture from the subsurface of the product immediately adjacent the exterior surface thereof without materially reducing the moisture content of the interior and thereby cooking said subsurface while leaving the interior in substantially raw uncooked condition, immediately thereafter subjecting the product while in the dried cooked condition effected by the aforementioned step and while moving along said path of travel to a blast of cold air having a temperature not higher than the freezing temperature of the product and thereby materially reducing the temperature of said subsurface without materially reducing the temperature of the interior, and immediately after the aforementioned cooling step, delivering the product with its subsurface in the dried, cooked, cooled condition effected by the aforementioned steps to the frying apparatus for immediate frying, said blasts of hot and cold air being directed upwardly against said product and constituting at least one of the means for conveying said product along said path of travel.

9. A method of preparing an edible fried product comprising drying the substantially raw product and thereby reducing the moisture content of the subsurface immediately adjacent the exterior surface thereof to a level substantially below the moisture level of the interior, cooking said subsurface while said subsurface is still substantially higher than the freezing temperature of said product, and frying said product while said subsurface thereof is still substantially in the dried cooled condition effected by the aforementioned steps, wherein the cooling is quickly accomplished under such conditions that upon completion of the cooling step the temperature of the interior of the product remains substantially unchanged from what it was at the start of said cooling step.

10. A method of preparing an edible fried product comprising drying the substantially raw product and thereby reducing the moisture content of the subsurface immediately adjacent the exterior surface thereof to a level substantially below the moisture level of the interior, substantially immediately thereafter cooling said subsurface and materially reducing the temperature thereof while said subsurface is at the reduced moisture level effected by said drying, and substantially immediately thereafter frying said product while said subsurface thereof is still substantially in the dried cooled condition effected by the aforementioned steps, wherein said drying is accomplished by subjecting the product to a blast of hot air having a temperature not lower than the cooking temperature of the product for a period of time sufficient to achieve said drying of said subsurface without materially reducing the moisture content of the interior of said product and wherein said cooling is accomplished by subjecting said product to a blast of cold air having a temperature not higher than the freezing temperature of the product for a period of time sufficient to effect said material reduction in temperature of said subsurface without materially reducing the temperature of the interior of said product.

References Cited by the Examiner

UNITED STATES PATENTS

| | | | |
|---|---|---|---|
| 2,565,942 | 8/1951 | Barsky | 99—103 |
| 2,597,065 | 5/1952 | Chase | 99—193 |
| 2,897,772 | 8/1959 | Hunter | 99—352 X |
| 3,022,722 | 2/1962 | Arvan | 99—354 |

OTHER REFERENCES

Talburt et al., "Potato Processing," 1959, pages 243, 260, and 289.

A. LOUIS MONACELL, *Primary Examiner.*